US012654672B2

(12) United States Patent
Mohideen

(10) Patent No.: US 12,654,672 B2
(45) Date of Patent: Jun. 16, 2026

(54) VEHICLE CONTROL ARRANGEMENT

(71) Applicant: Farlin Anooz Mohideen, Belmont (AU)

(72) Inventor: Farlin Anooz Mohideen, Belmont (AU)

( * ) Notice: Subject to any disclaimer, the term of this patent is extended or adjusted under 35 U.S.C. 154(b) by 15 days.

(21) Appl. No.: 18/873,172

(22) PCT Filed: Jun. 15, 2023

(86) PCT No.: PCT/AU2023/050533
§ 371 (c)(1),
(2) Date: Dec. 9, 2024

(87) PCT Pub. No.: WO2023/245227
PCT Pub. Date: Dec. 28, 2023

(65) Prior Publication Data
US 2025/0313187 A1     Oct. 9, 2025

(30) Foreign Application Priority Data

Jun. 19, 2022    (AU) ................................. 2022901665

(51) Int. Cl.
B60W 10/20          (2006.01)
B60W 10/18          (2012.01)
(Continued)

(52) U.S. Cl.
CPC ............ B60W 10/20 (2013.01); B60W 10/18 (2013.01); B60W 50/082 (2013.01);
(Continued)

(58) Field of Classification Search
CPC ...... B60W 10/20; B60W 60/00; B60W 10/18; B60W 50/082; B60W 2050/007; B60W 2710/18; B60W 2710/20
See application file for complete search history.

(56) References Cited

U.S. PATENT DOCUMENTS 9,164,508 B1 * 10/2015 Takach, Jr. ........... G05D 1/0011
2007/0198145 A1    8/2007 Norris
(Continued)

FOREIGN PATENT DOCUMENTS

CN        108357554 A      8/2018
CN        110217236 A      9/2019
(Continued)

OTHER PUBLICATIONS

International-Type Search Report, mailed on Jul. 29, 2022, by the Australian Patent Office for Australian Application No. (2022901665), 22 pages.
(Continued)

*Primary Examiner* — Hussein Elchanti
(74) *Attorney, Agent, or Firm* — Cherskov Flaynik & Gurda, LLC

(57) ABSTRACT

A vehicle control arrangement includes a mechanical interface configured to be interposed between an existing steering wheel column shaft and steering wheel of a vehicle. The arrangement includes at least two drive units, each configured to selectively engage with said mechanical interface upon activation for actuating the steering column shaft to steer the vehicle. Also included are a detector arranged in register with said mechanical interface and configured to detect manual interaction with the steering wheel, and a controller arranged in signal communication with the detector and drive units, the controller configured to, when autonomous control is selected, engage and control at least one drive unit to effect autonomous steering of the vehicle, and when manual interaction is detected, to disengage said drive units. In this manner, a vehicle is retrofittable with said control arrangement to facilitate alternating between autonomous and manual control, as required.

19 Claims, 7 Drawing Sheets

(51) Int. Cl.
    B60W 50/08         (2020.01)
    B60W 60/00         (2020.01)
    *B60W 50/00*          (2006.01)

(52) U.S. Cl.
    CPC ....... B60W 60/00 (2020.02); *B60W 2050/007*
        (2013.01); *B60W 2710/18* (2013.01); *B60W
                                    2710/20* (2013.01)

(56)                References Cited

U.S. PATENT DOCUMENTS

| | | | | |
|---|---|---|---|---|
| 2015/0120089 | A1* | 4/2015 | Peel | B62D 1/00 |
| | | | | 701/2 |
| 2016/0334790 | A1* | 11/2016 | Rust | B60T 13/662 |
| 2017/0028992 | A1 | 2/2017 | Sautter | |
| 2017/0261988 | A1 | 9/2017 | Owens | |
| 2020/0150659 | A1 | 5/2020 | Guptha | |
| 2020/0231168 | A1* | 7/2020 | Uthaicharoenpong | H04W 4/40 |

| | | | | |
|---|---|---|---|---|
| 2020/0264634 | A1* | 8/2020 | Hadi | B60W 60/0023 |
| 2021/0245791 | A1 | 8/2021 | Krone | |
| 2021/0339797 | A1 | 11/2021 | Carreirão | |

FOREIGN PATENT DOCUMENTS

| | | |
|---|---|---|
| CN | 112498469 A | 3/2021 |
| CN | 114132375 A | 3/2022 |
| KR | 20200011335 A | 2/2020 |

OTHER PUBLICATIONS

Written Opinion mailed on Jul. 19, 2023, by the European Patent Office for International Application No. PCT/AU2023/050533, 6 pages.

International Preliminary Report on Patentability by the Australian Patent Office in PCT/AU2023/050533, dated Oct. 13, 2023 (with annexed Applicant's Amendments and Arguments under Article 34), 20 pages.

* cited by examiner

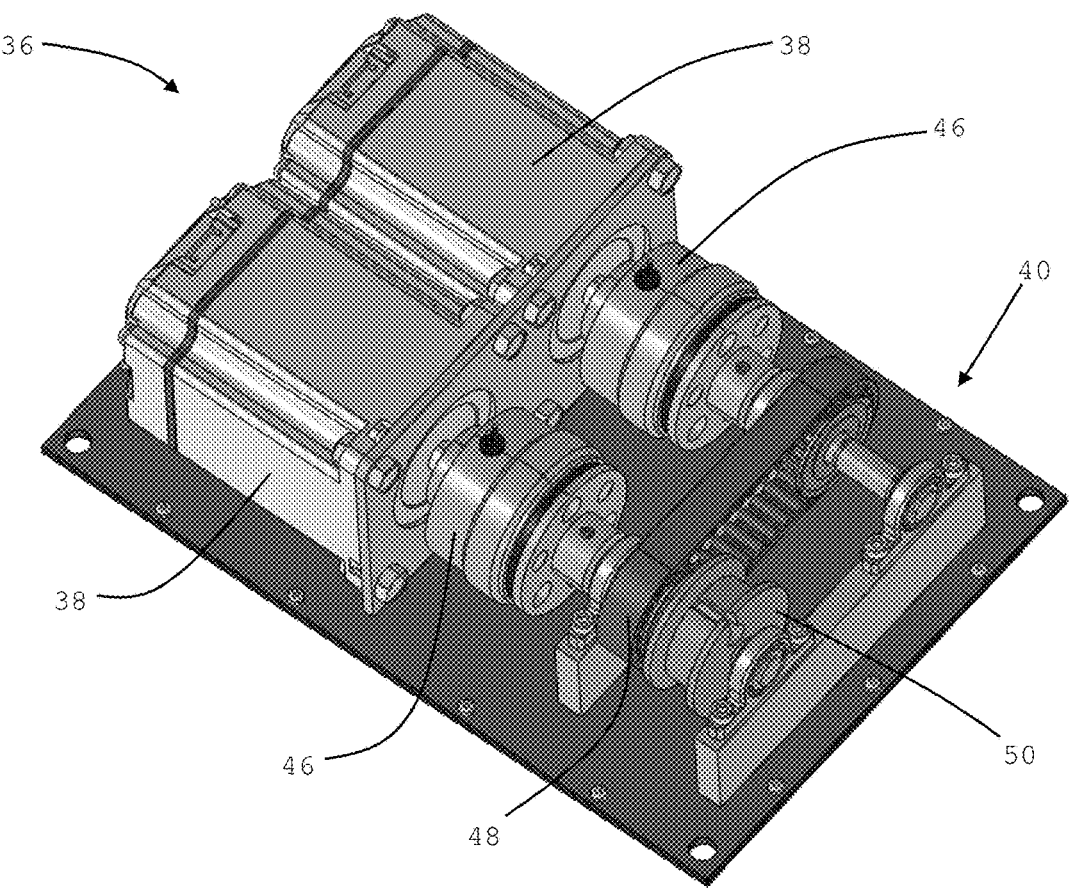
_Figure 8._
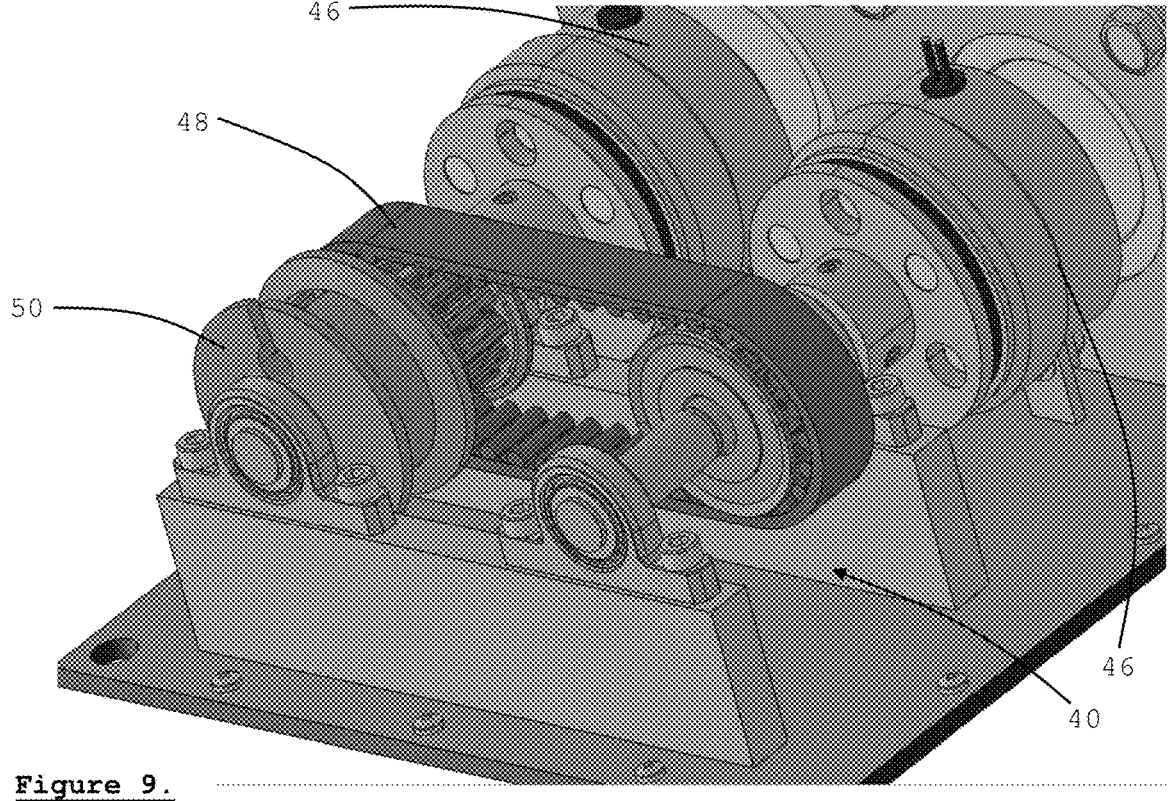
_Figure 9._

VEHICLE CONTROL ARRANGEMENT

TECHNICAL FIELD

This invention relates broadly to a vehicle control arrangement, and more specifically to a control arrangement for retrofitting a vehicle without modification to alternate between autonomous and manual control, as well as a vehicle including such a control arrangement.

BACKGROUND ART

The following discussion of the background art is intended to facilitate an understanding of the present invention only. The discussion is not an acknowledgement or admission that any of the material referred to is or was part of the common general knowledge as at the priority date of the application.

A self-driving or autonomous vehicle is generally a car or similar vehicle which incorporates vehicular automation, that is, a ground vehicle that is capable of sensing its environment and moving safely with little or no human input. Self-driving vehicles generally combine a variety of sensors to perceive their surroundings, such as thermographic cameras, radar, lidar, sonar, GPS, odometry and inertial measurement units. Advanced control systems interpret sensory information to identify appropriate navigation paths, as well as obstacles and relevant signage.

The advent of autonomous vehicles was preceded by technological developments in the automotive industry, such as so-called 'drive-by-wire' or 'steer-by-wire' control systems. Such systems generally comprise the use of electrical or electro-mechanical systems for performing vehicle functions traditionally achieved by mechanical linkages. This technology replaces the traditional mechanical control systems with electronic control systems using electromechanical actuators and human-machine interfaces such as pedal and steering feel emulators. With these systems, components such as mechanical shafts, pumps, hoses, belts, coolers, vacuum servos and master cylinders can be eliminated from the vehicle, facilitating easier electronic control.

Conventional 'drive-by-wire' or 'steer-by-wire' control systems able to render a vehicle somewhat autonomous require tailored engineering to incorporate into a vehicle, often requiring the vehicle control systems to be engineered to work and synchronise with such control systems, or at least require modification to a vehicle to allow use in a retrofit scenario.

For example, US 2016/0334790 to CRUISE AUTOMATION, INC. describes an autonomous vehicle retrofit system comprising a steering motor that interfaces with a steering column via a coupling mechanism comprising a pulley or gear clamped to the steering column, with another gear, timing belt or timing chain required to link the motor with the steering column. This system also requires a mechanism, such as a clutch, to enable engagement and disengagement between the steering column and steering motor.

In various applications where safety is paramount, such as on mining sites and similar industrial applications, modification of vehicles is not permitted for safety reasons, nor preferred due to manpower and time required to perform such safe modifications. As a result, such conventional systems such as that described in US 2016/0334790 are not useable as they require modification of, for example, a vehicle steering column to accommodate a coupling mechanism, which typically necessitates dismantling a dashboard and steering column of the vehicle to retrofit.

In light hereof, Applicant has identified a shortcoming in the art for retrofitting of 'non-autonomous' conventional vehicles, that may not have been originally manufactured for autonomous operation, to perform autonomous operation without requiring engineering modification of the vehicle itself. For example, in a mining or industrial environment, which has also seen increased use of autonomous systems in recent times, the ability to incorporate conventional non-autonomous vehicles into such autonomous operations can extend the useful life of expensive equipment, such as haul trucks and related equipment.

The current invention was conceived with this goal in mind.

SUMMARY OF THE INVENTION

According to a first aspect of the invention there is provided a vehicle control arrangement comprising:

a mechanical interface configured to be interposed between an existing steering wheel column shaft and steering wheel of a vehicle;

at least two drive units each configured to selectively engage with said mechanical interface upon activation for actuating the steering column shaft to steer the vehicle;

a detector arranged in register with said mechanical interface and configured to detect manual interaction with the steering wheel; and a controller arranged in signal communication with the detector and drive units, the controller configured to:

i. when autonomous control is selected, engage and control at least one drive unit to effect autonomous steering of the vehicle; and ii. when manual interaction is detected, to disengage said drive units;

wherein a vehicle is retrofittable with control arrangement to facilitate alternating between autonomous and manual control, as required.

In an embodiment, the mechanical interface is configured to be interposed between an existing steering wheel column shaft and steering wheel of a vehicle without requiring dismantling and/or removal of a dashboard and/or steering column of said vehicle, e.g. via simple removal of the steering wheel.

In an embodiment, the mechanical interface comprises a link defining a link shaft for receiving the steering wheel and a socket for receiving said existing steering wheel column shaft therein so that rotation of the steering wheel rotates the steering wheel column shaft accordingly.

Typically, the link shaft and received existing steering wheel column shaft are aligned.

In an embodiment, the mechanical interface comprises a steering gear arranged coaxially about the link to be coaxial with the link and existing steering wheel column shafts.

In an embodiment, each drive unit includes a drive gear engaged with the steering gear, so that actuation of the drive gear rotates the steering wheel column shaft via the steering gear.

In an embodiment, the drive units are arranged coaxially about the aligned link shaft and existing steering wheel column shaft so that the drive units lie proximate an existing dashboard of the vehicle underneath the steering column and above legs of a driver of said vehicle.

In an embodiment, the drive unit comprises an electromechanical motor, such as a stepper motor, or the like.

Typically, each drive unit comprises a clutch whereby the drive unit is configured to selectively engage with the mechanical interface.

Typically, the clutch of a drive unit is arranged between an output shaft of the drive unit and the drive gear.

In an embodiment, the drive units are arranged coaxially with the existing steering wheel column shaft.

Typically, the clutch of a drive unit is controlled by the controller to engage the drive unit to steer the vehicle when autonomous control is selected.

In an embodiment, the detector comprises a torque sensor, such as a static or reaction torque sensor.

In an embodiment, the detector is arranged proximate the mechanical interface for detecting interaction with the steering wheel.

In an embodiment, the detector is arranged on and/or about the link shaft of the mechanical interface.

In an embodiment, the controller comprises part of a vehicular automation system able to drive the vehicle autonomously and whereby autonomous control is selectable.

Typically, the mechanical interface, drive units and detector are arranged within a housing which is shaped and dimensioned to be interposed underneath the steering wheel in a compact and ergonomic manner to facilitate retrofitting to a vehicle.

In an embodiment, the vehicle control arrangement includes a brake assembly comprising:

at least two brake actuators configured to share a common mechanical output; and a linkage configured to link said common mechanical output to an existing brake pedal of the vehicle;

wherein the controller is configured to control the brake actuators in order to effect autonomous braking of the vehicle.

In an embodiment, the linkage is configured to link to the existing brake pedal via a tension connection where the brake pedal is pulled from behind (rather than compression where the pedal is pushed) to minimise interference with normal manual actuation of the brake pedal.

Typically, the brake assembly is housed in a compact and ergonomic manner to facilitate retrofitting to a vehicle.

In an embodiment, the brake actuator comprises an electromechanical motor, such as a stepper motor, or the like.

Typically, each brake actuator comprises a clutch whereby the brake actuator is configured to selectively engage with the brake pedal.

In an embodiment, the brake actuators are configured to share a common mechanical output via a toothed belt connecting output shafts of the actuators to said common mechanical output.

Typically, the common mechanical output comprises a pulley with a cable spoolable thereon, said cable connected to the brake pedal as a tension connection from behind.

In an embodiment, each brake actuator comprises a clutch between the output shaft thereof and the toothed belt, said clutch under control of the controller to engage a brake actuator to brake the vehicle when autonomous control is selected.

In an embodiment, the controller is configured for redundancy for safety purposes in steering and/or braking the vehicle.

According to a second aspect of the invention there is provided a vehicle adapted for autonomous operation, said vehicle comprising the vehicle control arrangement in accordance with the first aspect of the invention.

According to a further aspect of the invention there is provided a vehicle control arrangement and a vehicle including such a control arrangement, substantially as herein described and/or illustrated.

BRIEF DESCRIPTION OF THE DRAWINGS

The description will be made with reference to the accompanying drawings in which:

FIG. 8 is a diagrammatic perspective-view representation showing components of the brake assembly of FIG. 7;

FIG. 9 is a diagrammatic perspective-view representation showing a common mechanical output of the brake assembly of FIG. 6.

DETAILED DESCRIPTION OF EMBODIMENTS

Figure 1:
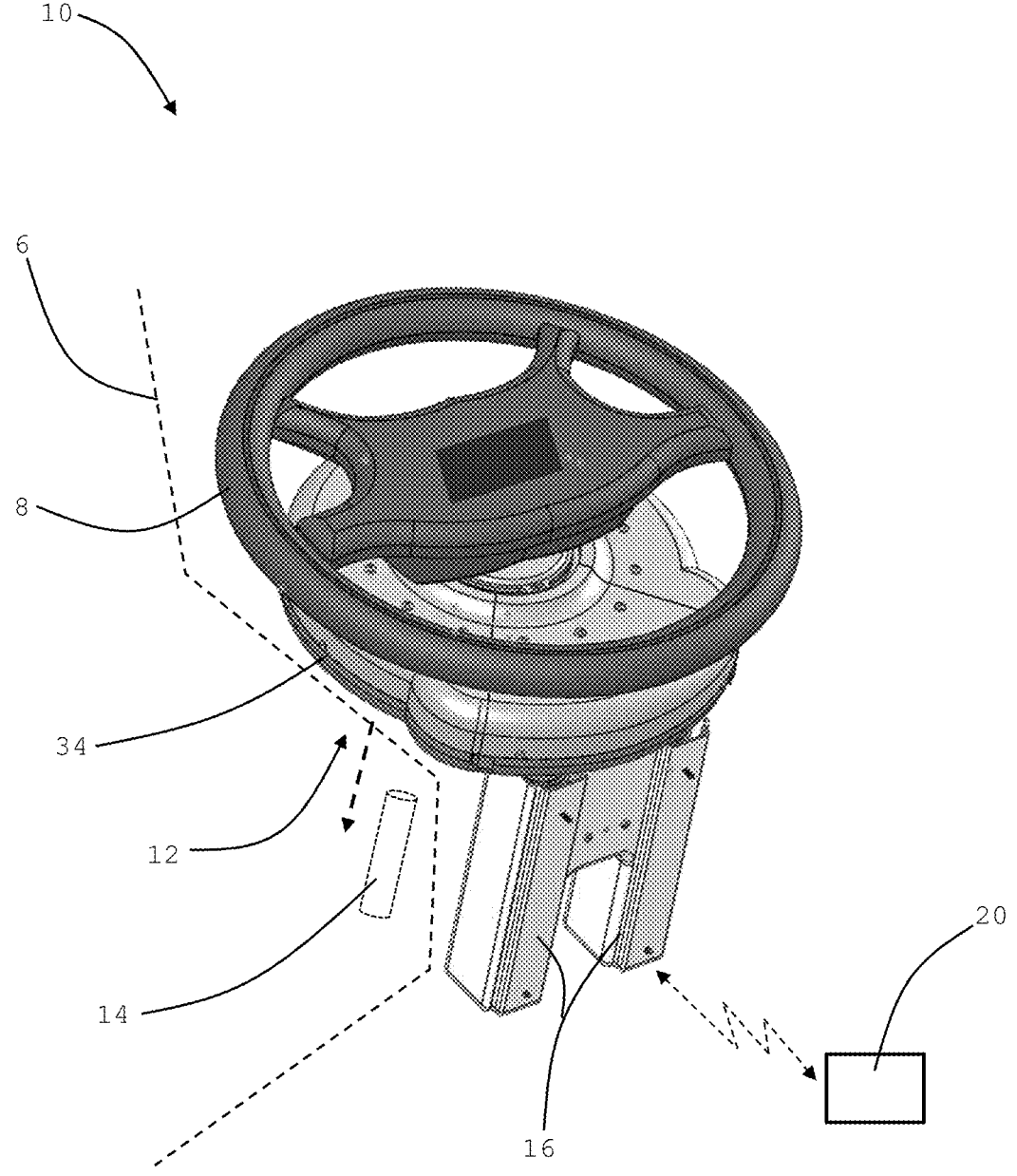
FIG. 1 is a diagrammatic perspective-view representation vehicle of an embodiment of a vehicle control arrangement, in accordance with aspects of the present invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

Broadly, the present invention provides for a vehicle control arrangement 10 with which a 'non-autonomous' conventional vehicle, which may not have been originally manufactured for autonomous operation, is retrofittable in order to perform autonomous operation. As will be appreciated by the skilled addressee, such a vehicle may take many forms, with the exemplified embodiment of arrangement 10 useable to steer and brake a vehicle, as described below. The vehicle control arrangement 10 broadly comprises a mechanical interface 12, at least two drive units 16, a detector 18 and a controller 20.

The mechanical interface 12 is configured to be interposed between an existing steering wheel column shaft 14 and steering wheel 8 of the vehicle. In the exemplified embodiment, the mechanical interface 12 comprises a link 22 defining a link shaft 24 for receiving the steering wheel 8 and a socket 26 for receiving the existing steering wheel column shaft 14 therein so that rotation of the steering wheel 8 rotates the steering wheel column shaft 14 accordingly. Typically, the link shaft 24 and received existing steering wheel column shaft 14 are aligned, but variations hereon are possible.

Figure 2:
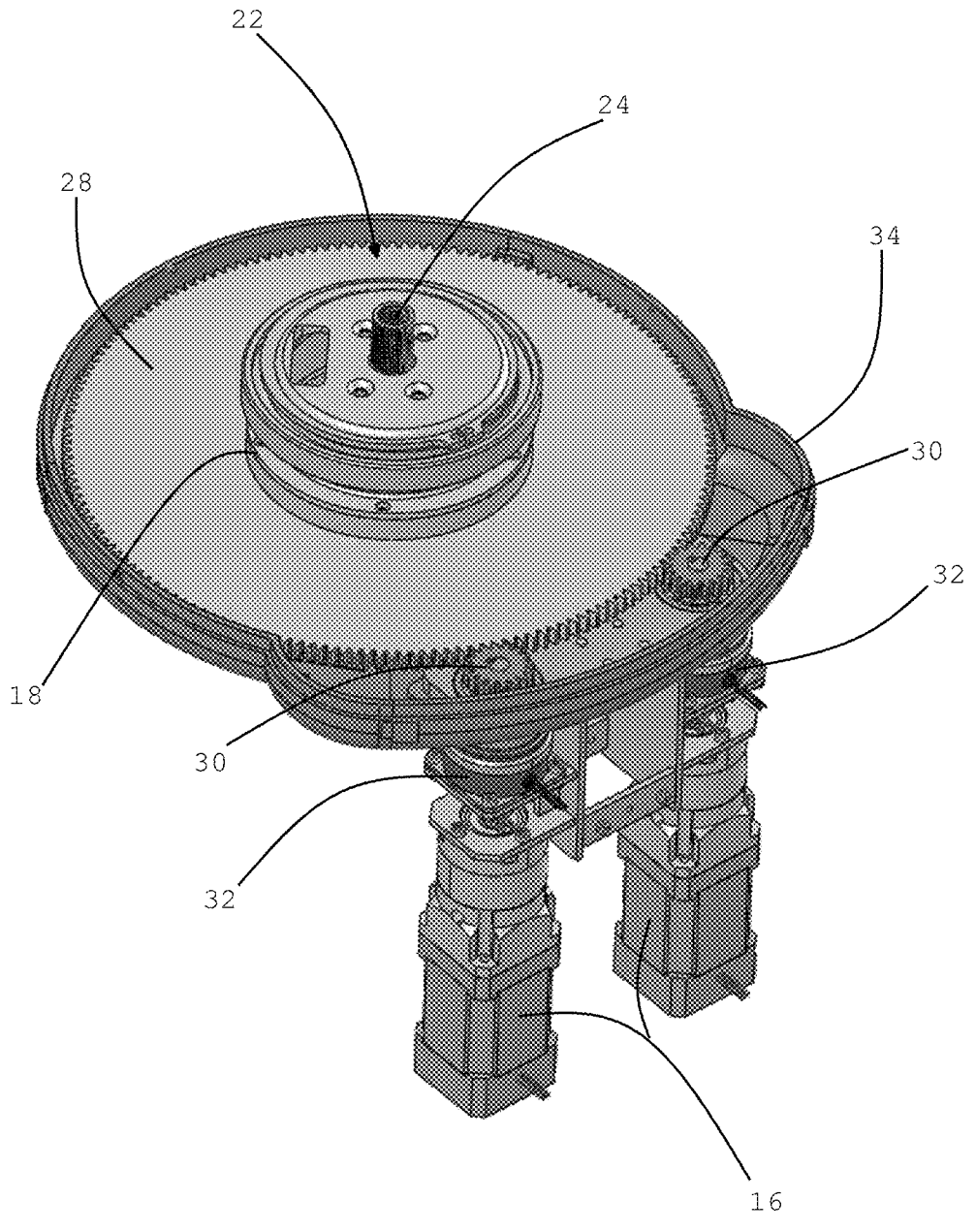
FIG. 2 is a diagrammatic perspective-view representation of the vehicle control arrangement of FIG. 1, with a steering wheel removed and showing a mechanical interface and drive units.
Figure 3:
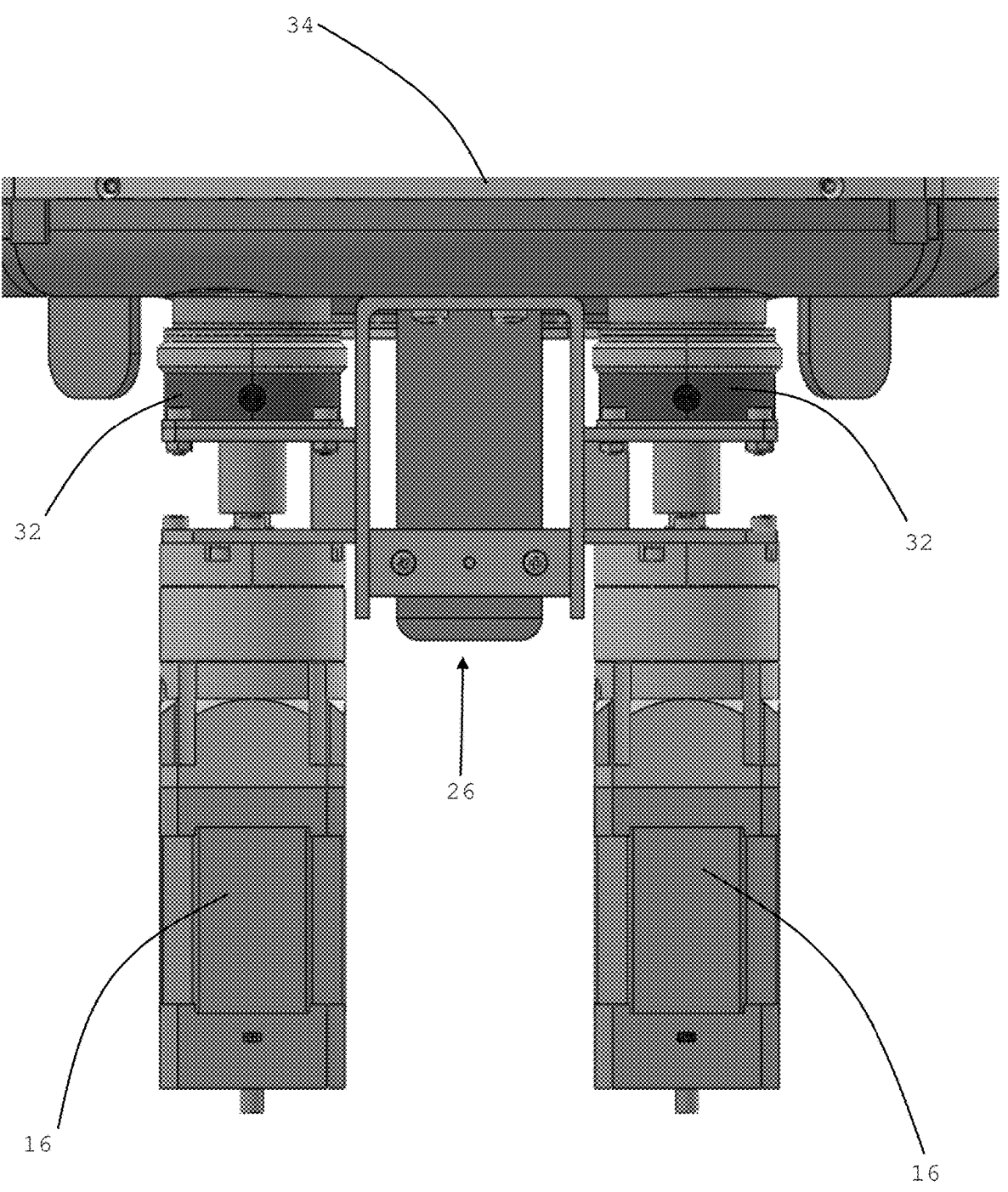
FIG. 3 is diagrammatic side-view representation of the vehicle control arrangement of FIG. 2.

In one embodiment, an example of which is shown in FIG. 2, the mechanical interface 12 comprises a steering gear 28 which is arranged coaxially about the link 22 to be coaxial with the link and existing steering wheel column shafts 24 and 14. Of course, mechanical variations are possible and anticipated.

The vehicle control arrangement 10 also includes at least two drive units 16, each configured to selectively engage with said mechanical interface 12 upon activation for actuating the steering column shaft 14 to steer the vehicle. The skilled address is to appreciate that at least two drive units 16 are used in order to provide redundancy for safety, i.e. of one of the units 16 fails, the other can be used.

In one embodiment, each drive unit 16 includes a drive gear 30 engaged with the steering gear 28, as shown, so that actuation of the drive gear 30 rotates the steering wheel column shaft 14 via the steering gear 28. In an embodiment, the drive unit 16 comprises an electromechanical motor, such as a stepper motor, or the like.

The skilled addressee is to appreciate that the mechanical interface 12 is generally configured to be interposed between the existing steering wheel column shaft 12 and steering wheel 8 of a vehicle without requiring dismantling and/or removal of a dashboard 6 and/or steering column of said vehicle. As described above, the mechanical interface 12 is specifically configured for retrofitting to a vehicle via simple removal of the steering wheel, i.e. the steering wheel 8 is removed and the arrangement 10 is placed onto the shaft 14, which also aligns with the link shaft 24, and the steering wheel 8 replaced onto the link shaft 24.

To further facilitates such ease of retrofitting, the drive units 16 are also generally arranged coaxially about the aligned link shaft 24 and existing steering wheel column shaft 14, as shown, so that the drive units 16 lie proximate an existing dashboard (not shown) of the vehicle underneath the steering column and above legs of a driver of said vehicle, when in use. Such arrangement of the drive units 16 are ergonomic without interfering with a driver of the vehicle and does not require disassembly of the dashboard 6 and/or steering column to facilitate retrofitting of arrangement 10.

In a typical embodiment, each drive unit 16 also comprises a clutch 32 whereby the drive unit 16 is configured to selectively engage with the mechanical interface 12. Typically, the clutch 32 of a drive unit 16 is arranged between an output shaft of the drive unit 16 and the drive gear 30, as shown. In the exemplified embodiment, the drive units 16 are arranged coaxially with the existing steering wheel column shaft 14, but variations hereon as possible. The clutch 32 of a drive unit 16 is generally controlled by the controller 20 to engage the drive unit 16 to steer the vehicle when autonomous control is selected.

Figure 4:
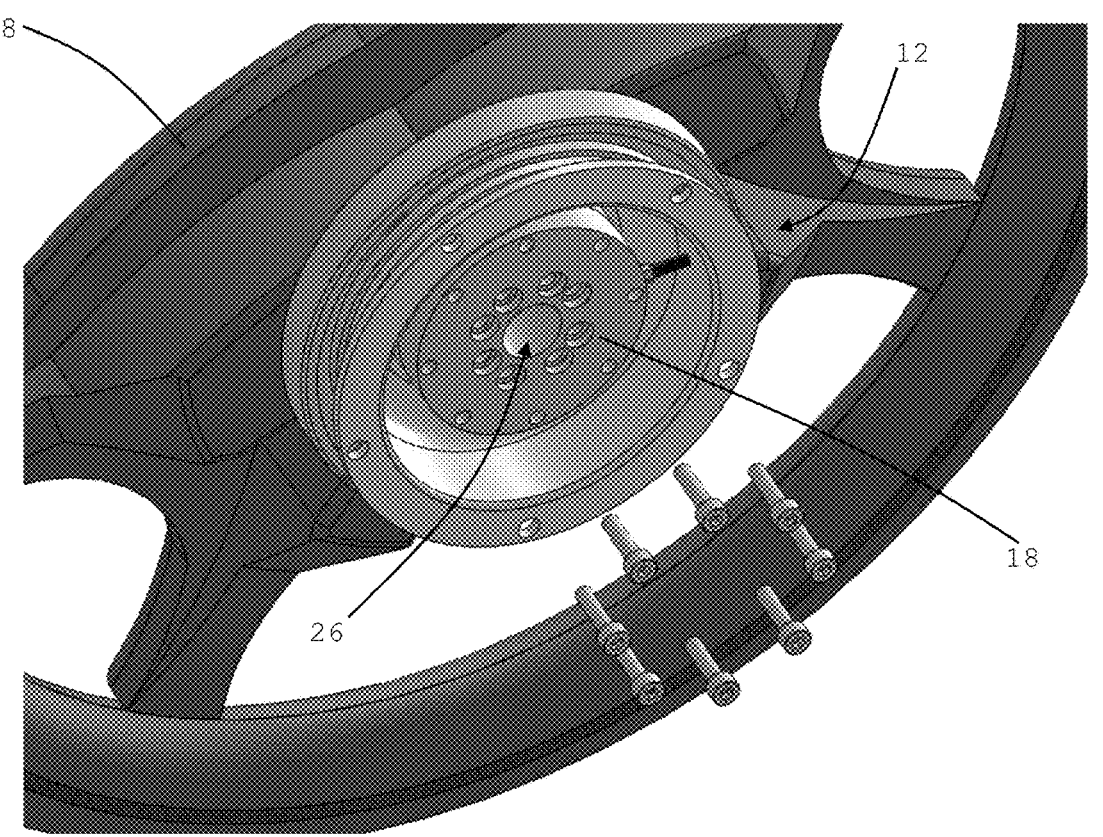
FIG. 4 is a diagrammatic perspective-view representation of an example of a detector of the vehicle control arrangement of FIG. 1.
Figure 5:
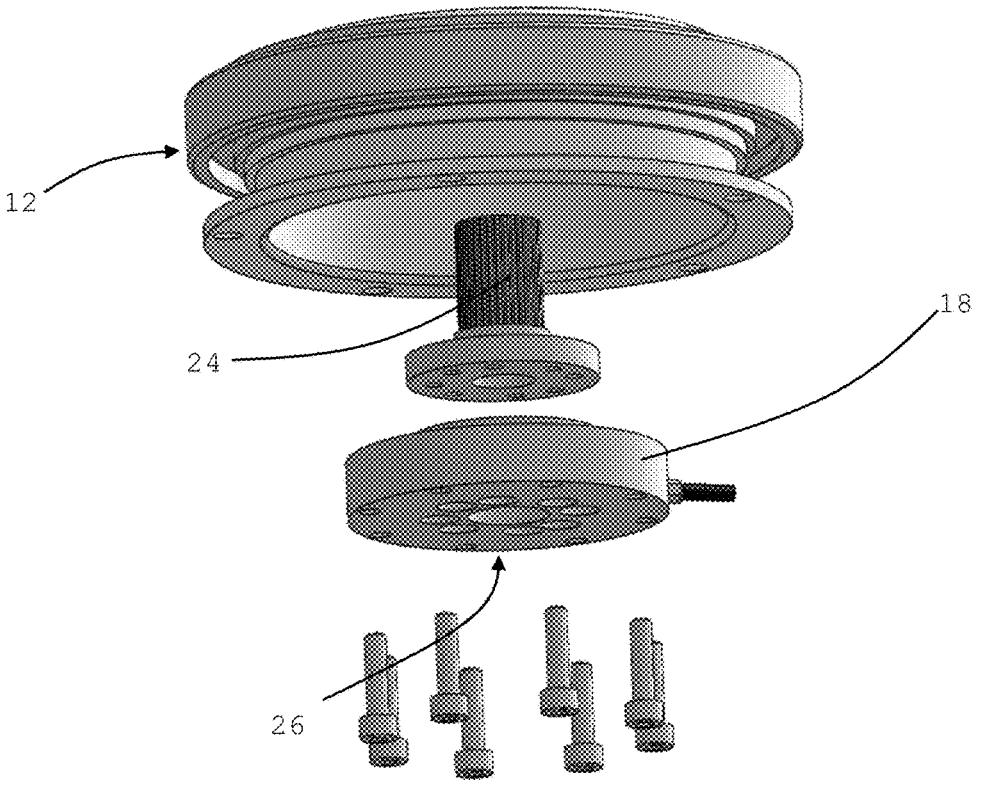
FIG. 5 is a diagrammatic exploded-view representation of the detector and parts of the mechanical interface of the vehicle control arrangement of FIG. 1.

The vehicle control arrangement 10 also includes the detector 18 which is arranged in register with the mechanical interface, i.e. in order to be influenced by or acted upon by the mechanical interface 12. The detector 18 is configured to detect manual interaction with the steering wheel 8. In an embodiment, the detector 18 comprises a torque sensor, such as a static or reaction torque sensor, for sensing such manual interaction, i.e. when a person touches the steering wheel. In the exemplified embodiment, the detector 18 is arranged proximate the mechanical interface 12 for detecting such interaction with the steering wheel 8. The detector 18 is typically is arranged on and/or about the link shaft 24 of the mechanical interface 12, as shown more clearly in FIGS. 4 and 5.

The vehicle control arrangement 10 further includes the controller 20 which is arranged in signal communication with the detector 18 and drive units 16. Such communication may be via wired and/or wireless connections, as known in the art. The controller 20 is broadly configured to, when autonomous control is selected, engage and control at least one drive unit 16 to effect autonomous steering of the vehicle, and when manual interaction is detected, to disengage said drive units 16 in order not to interfere with manual steering of the vehicle.

In the manner described, the vehicle is retrofittable with said control arrangement 10 to facilitate alternating between autonomous and manual control, as required. The controller 20 may be realised in various ways, as will be appreciated by the skilled addressee. In one embodiment, the controller 20 may comprise part of a vehicular automation system able to drive the vehicle autonomously and whereby autonomous control is selectable. Alternatively, the controller 20 may comprise a discrete microcontroller, such as a programmable logic controller (PLC), configured to perform the required functions. Again, variations hereon are possible and anticipated.

Figure 10:
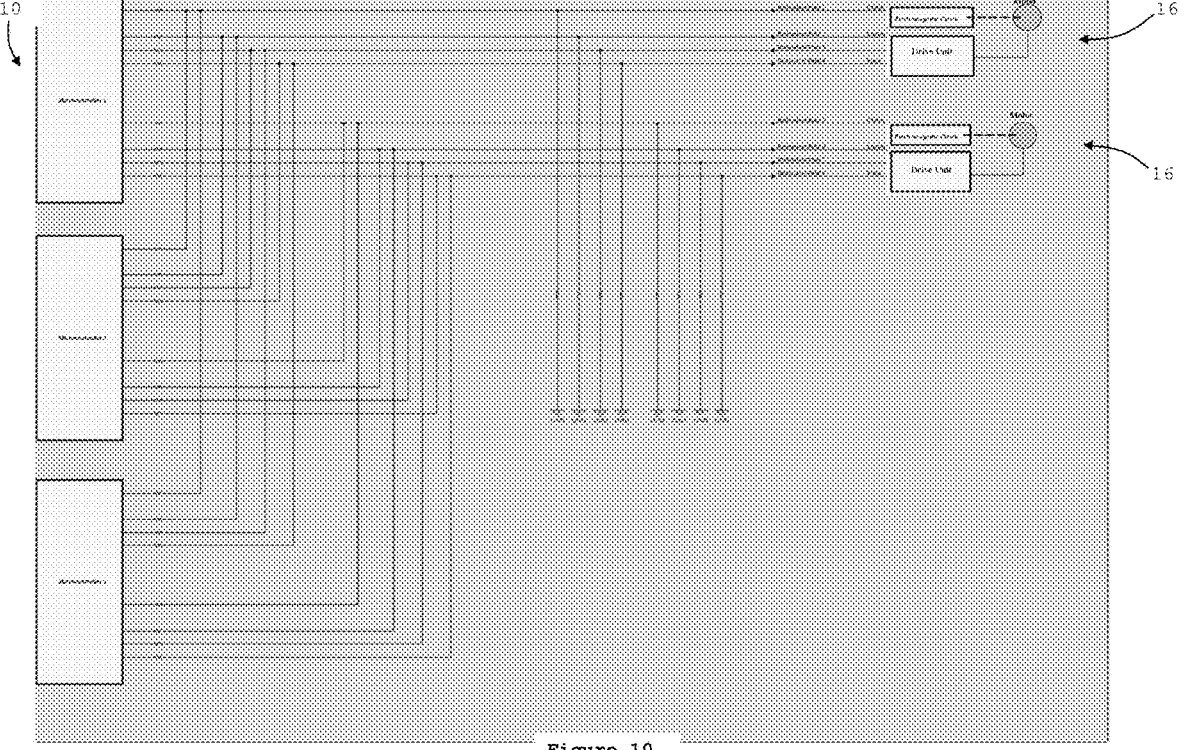
FIG. 10 is an overview representation of a circuit diagram of an example for implementing the controller of the vehicle control arrangement, showing redundancy for safety purposes.

With reference to FIG. 10 of the accompanying drawings, the controller 20 is generally configured for redundancy for safety purposes in steering and/or braking the vehicle. As will be appreciated by the skilled addressee, such redundancy is typically the duplication of critical components or functions of a system with the intention of increasing reliability of the system, usually in the form of a backup or fail-safe, or to improve actual system performance, as required. For example, in the exemplified (but non-limiting) embodiment, the controller 20 may be realised using logic components, such as TTL and CMOS components, along with a resistor network to produce binary control signals as a mechanism for redundancy. In such a manner, if three distinct microcontrollers are used, should one of them fail, the implementation can still produce adequate voltages for control purposes. Of course, variations hereon are possible and anticipated.

In a typical embodiment, the mechanical interface 12, drive units 16 and detector 18 are arranged within a housing 34 which is shaped and dimensioned to be interposed underneath the steering wheel 8 in a compact and ergonomic manner to facilitate retrofitting to a vehicle. For example, a small housing 34 able to be retrofitted on a variety of vehicles, or the like.

With reference to FIGS. 6 to 9 of the accompanying drawings, the vehicle control arrangement 10 may further include a brake assembly 36 to effect autonomous braking when retrofitted to a conventional vehicle. The brake assembly 36 broadly comprises at least two brake actuators 38 that are configured to share a common mechanical output 40, as well as a linkage 42 which is configured to link said common mechanical output 40 to an existing brake pedal 44 of the vehicle. As with the drive units 16, at least two brake actuators 38 are used for redundancy purposes. In this manner, the controller 20 may also be configured to control the brake actuators in order to effect autonomous braking of the vehicle.

Figures 6, 7:
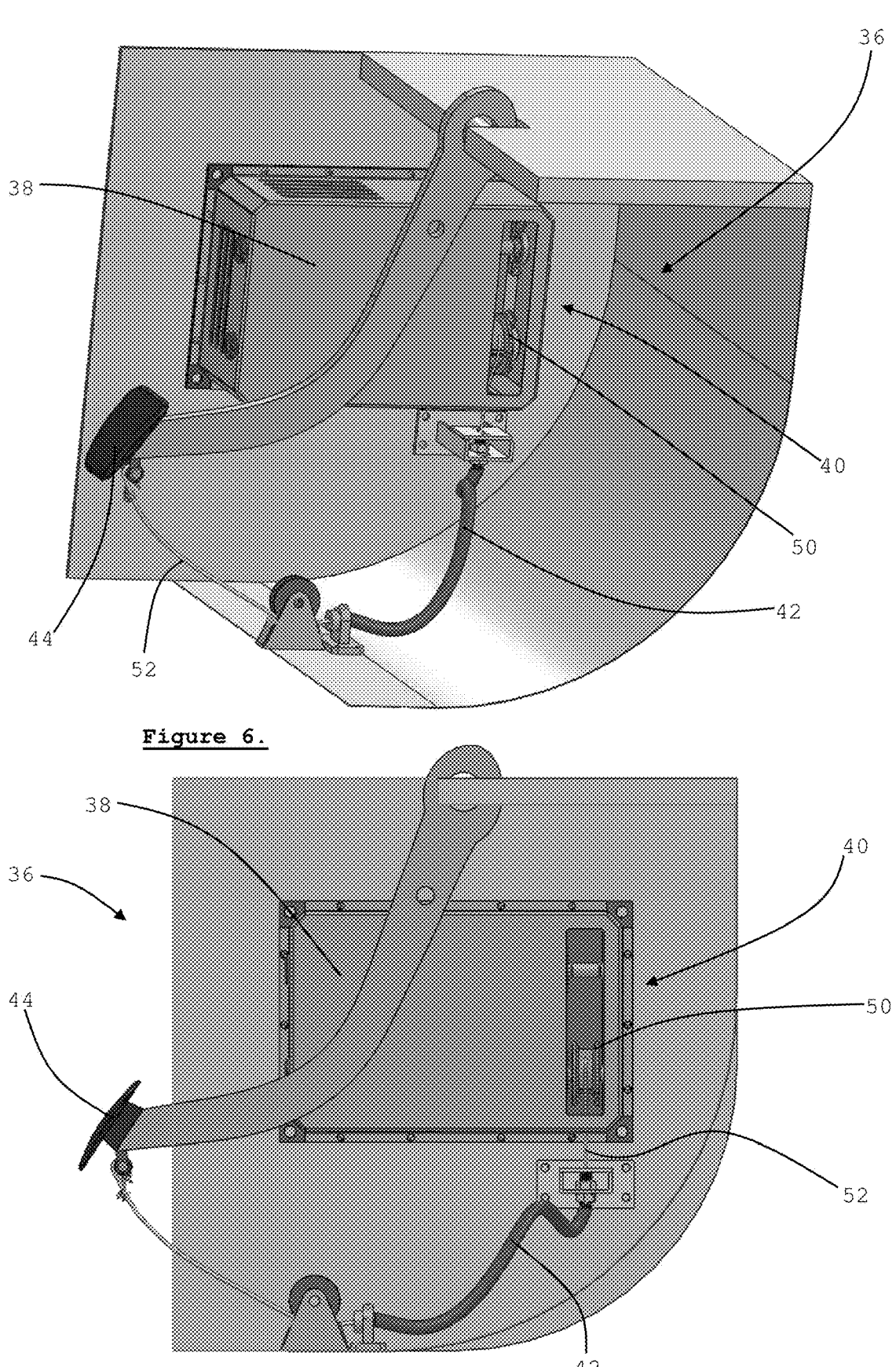
FIG. 6 is a diagrammatic perspective-view representation of an embodiment of a brake assembly of the vehicle control arrangement of FIG. 1.
FIG. 7 is a diagrammatic side-view representation of the brake assembly of FIG. 6.

In one embodiment, the linkage 42 is configured to link to the existing brake pedal 44 via a tension connection, where the brake pedal 44 is pulled from behind (rather than compression where the pedal 44 is pushed or otherwise actuated) in order to minimise interference with normal manual actuation of the brake pedal 44. For example, as shown in FIGS. 6 and 7, such a linkage 42 comprises a cable 52 with suitable routing hardware so that brake actuators pull the brake pedal for braking. This arrangement does not interfere with conventional braking.

In one embodiment, as with the drive units 16, the brake actuators 38 comprise an electromechanical motor, such as a stepper motor, or the like. Typically, each brake actuator 38 also comprises a clutch 46 whereby the brake actuator 38 is configured to selectively engage with the brake pedal 44. As with the drive units 16, the brake actuator clutch 46 is controlled by the controller 20.

In the exemplified embodiment, the brake actuators 38 are configured to share a common mechanical output 40 via a toothed belt 48 connecting output shafts of the actuators 38 to said common mechanical output 40. This common mechanical output 40 comprises suitable bearings and mounting hardware, as shown, for maintaining required relationships between the output shafts of the brake actuators 38. However, variations hereon are possible and expected. In such an example, the common mechanical output 40 comprises a pulley 50 with the cable 52 spoolable thereon, said cable 52 connected to the brake pedal 44 as a tension connection from behind.

As shown, each brake actuator 38 comprises a clutch 46 between the output shaft thereof and the toothed belt 48, said clutch 46 under control of the controller 20 to engage a brake actuator 38 to brake the vehicle when autonomous control is selected. The brake assembly 36 is typically housed in a compact and ergonomic manner to facilitate retrofitting to a vehicle.

Applicant believes it particularly advantageous that the present invention provides for a vehicle control arrangement 10 whereby a conventional and non-autonomous vehicle is retrofittable for autonomous control, whilst allowing for manual control as well. Arrangement 10 includes redundancy, typically in the drive units 16, brake actuators 38, clutches 32 and 46, as well as controller 20, as described herein, given that the arrangement 10 is used for vehicle control when autonomous driving is selected.

Importantly, vehicle control arrangement 10 is specifically configured to allow retro-fitment to a vehicle typically via simple removal of an existing steering wheel, with the mechanical interface insertable onto an existing steering wheel column without shaft interfering with an existing dashboard of the vehicle, after which the steering wheel can simply be placed onto the link shaft 24. Such specific configuration does not require modification or alteration of the vehicle, and does not require disassembly of the dashboard or steering column.

Additionally, industrial environments having existing autonomous systems typically used to manage and control autonomous operations, such as mine sites, are able to utilise the vehicle control arrangement 10 in order to incorporate vehicles, such as utility vehicles, into such autonomous operations on an ad hoc or more permanent basis, as required.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. A vehicle control arrangement comprising:
   a mechanical interface configured to be interposed onto an existing steering wheel column shaft of a vehicle between a steering wheel and said existing steering wheel column shaft, said mechanical interface comprising a link defining a link shaft at one end for receiving the steering wheel and a socket at another end for receiving said existing steering wheel column shaft therein, the link shaft and socket being aligned, so that rotation of the steering wheel conventionally rotates the existing steering wheel column shaft accordingly;

at least two drive units each configured to selectively engage with said mechanical interface upon activation for actuating the existing steering wheel column shaft to steer the vehicle;

a detector arranged in register with said mechanical interface and configured to detect manual interaction with the steering wheel; and a controller arranged in signal communication with the detector and drive units, the controller configured to:

i. when autonomous control is selected, engage and control at least one drive unit to effect autonomous steering of the vehicle; and ii. when manual interaction is detected, to disengage said drive units;

wherein the mechanical interface comprises a steering gear arranged coaxially about the link to be coaxial with the link and existing steering wheel column shafts, and wherein each drive unit includes a drive gear engaged with the steering gear, so that actuation of the drive gear rotates the existing steering wheel column shaft via the steering gear, said drive units arranged coaxially about the aligned link shaft and the existing steering wheel column shaft so that the drive units lie ergonomically proximate an existing dashboard of the vehicle underneath the steering column and above legs of a driver of said vehicle; wherein a vehicle is retrofittable with said control arrangement to facilitate alternating between autonomous and manual control.

2. The vehicle control arrangement of claim 1, wherein each drive unit comprises a clutch whereby the drive unit is configured to selectively engage with the mechanical interface.

3. The vehicle control arrangement of claim 2, wherein the clutch of a drive unit is arranged between an output shaft of the drive unit and the drive gear.

4. The vehicle control arrangement of claim 2, wherein the clutch of a drive unit is controlled by the controller to engage the drive unit to steer the vehicle when autonomous control is selected.

5. The vehicle control arrangement of claim 1, wherein the detector comprises a torque sensor, said detector incorporated as part of each drive unit.

6. The vehicle control arrangement of claim 1, wherein the detector is arranged proximate the mechanical interface for detecting interaction with the steering wheel.

7. The vehicle control arrangement of claim 6, wherein the detector is arranged on and/or about the link shaft of the mechanical interface.

8. The vehicle control arrangement of claim 1, wherein the controller comprises part of a vehicular automation system able to drive the vehicle autonomously and whereby autonomous control is selectable.

9. The vehicle control arrangement of claim 1, wherein the mechanical interface, drive units and detector are arranged within a housing which is shaped and dimensioned to be interposed underneath the steering wheel in a compact and ergonomic manner without interfering with a dashboard of the vehicle to facilitate retrofitting to said vehicle.

10. The vehicle control arrangement of claim 1, which includes a brake assembly comprising:

at least two brake actuators configured to share a common mechanical output; and a linkage configured to link said common mechanical output to an existing brake pedal of the vehicle;

wherein the controller is configured to control the brake actuators in order to effect autonomous braking of the vehicle.

11. The vehicle control arrangement of claim 10, wherein the linkage is configured to link to the existing brake pedal via a tension connection where the brake pedal is pulled from behind (rather than compression where the pedal is pushed) to minimise interference with normal manual actuation of the brake pedal.

12. The vehicle control arrangement of claim 10, wherein the brake assembly is unitarily housed in a compact and ergonomic manner to facilitate retrofitting to a vehicle.

13. The vehicle control arrangement of claim 10, wherein each brake actuator comprises a clutch whereby the brake actuator is configured to selectively engage with the brake pedal.

14. The vehicle control arrangement of claim 10, wherein the brake actuators are configured to share a common mechanical output via a toothed belt connecting output shafts of the actuators to said common mechanical output.

15. The vehicle control arrangement of claim 10, wherein the common mechanical output comprises a pulley with a cable spoolable thereon, said cable connected to the brake pedal as a tension connection from behind.

16. The vehicle control arrangement of claim 14, wherein each brake actuator comprises a clutch between the output shaft thereof and the toothed belt, said clutch under control of the controller to engage a brake actuator to brake the vehicle when autonomous control is selected.

17. The vehicle control arrangement of claim 1, wherein the controller is configured for redundancy for safety purposes in steering and/or braking the vehicle.

18. A vehicle adapted for autonomous operation, said vehicle comprising the vehicle control arrangement in accordance with claim 1.

19. The vehicle control arrangement of claim 5, wherein the torque sensor is a static or reaction torque sensor.

* * * * *